3,048,517
2-NITROALKYL PHOSPHOROTHIOATES

John P. Chupp, Kirkwood, Mo., assignor to Monsanto Chemical Company, St. Louis, Mo., a corporation of Delaware
No Drawing. Filed May 12, 1960, Ser. No. 28,518
3 Claims. (Cl. 167—22)

This invention relates to nematocidal compositions containing phosphorothioates as an active ingredient.

The phosphorothioates are 2-nitroalkyl phosphorothioates and can be represented by the structure

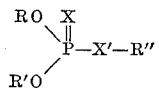

wherein R and R' are like or unlike lower alkyl radicals (i.e. alkyl radicals containing from 1 to 5 carbon atoms such as methyl, ethyl, propyl, butyl, amyl, and the various isomeric forms thereof) or lower alkoxyalkyl radicals (i.e. 2-methoxyethyl, 2-(ethoxy)ethyl, 2-(isopropoxy)-ethyl, 4-methoxybutyl, and like alkoxyalkyl radicals containing not more than 5 carbon atoms); wherein X and X' are chalkogens of atomic weight less than 40 (i.e. sulfur or oxygen) but wherein at least one of X and X' is sulfur; and wherein R" is a 2-nitroalkyl radical containing from 2 to 6 carbon atoms, e.g. 2-nitroethyl, 1-methyl-2-nitroethyl, 2-nitropropyl, 2-nitrobutyl, 2-nitroisobutyl, 2-nitro-t.butyl, 2-nitroisoamyl, 2-nitro-2-methylbutyl, 2-nitroisohexyl, etc. It is preferred to that R and R' be alkyl radicals containing not more than 2 carbon atoms (i.e. methyl or ethyl), that X be sulfur and that R" be a 2-nitroalkyl radical containing from 3 to 5 carbon atoms.

The S-(2-nitroalkyl) phosphorothioates of this invention can be prepared by reacting a mono-halogen substituted alkane having a nitro substituent on the carbon atom adjacent that having the halogen substituent, said halogen having an atomic number above 9 but not higher than 35 (i.e. chlorine or bromine) and said substituted alkane containing from 2 to 6 carbon atoms, with a substantially equimolar amount of a salt (i.e. ammonium or alkali metal such as sodium, potassium or lithium) of a phosphorothioic acid of the structure

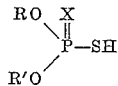

wherein R, R' and X have the aforedescribed significance in the presence of an inert organic liquid or solvent (e.g. benzene, toluene, xylene, acetone, butanone, dioxane, carbon tetrachloride, etc.). While a wide range of reaction temperatures can be employed provided the system is fluid (i.e. a temperature above the freezing point of the system up to and including the boiling point of the system) it is preferred to employ a reaction temperature in the range of 20° C. to 120° C.

The O-(2-nitroalkyl) phosphorothioates of this invention can be prepared by reacting a mono-hydroxy alkane having a nitro substituent on the carbon atom adjacent that having the hydroxy substituent, said substituted alkane containing from 2 to 6 carbon atoms, with a substantially equimolar amount of an acid halide of the structure

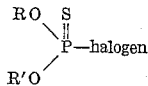

wherein R and R' have the aforedescribed significance and wherein "halogen" means a halogen having an atomic number above 9 but not higher than 35 (i.e. chlorine or bromine) in the presence of a hydrogen halide scavenging agent (e.g. sodium carbonate, triethylamine, tributylamine, dimethylaniline, lutidine, pyridine, etc.) in an amount sufficient to absorb the hydrogen halide by-product and an inert organic liquid or solvent (e.g. benzene, toluene, xylene, acetone, butanone, dioxane, etc.). While a wide range of reaction temperatures can be employed provided the system is fluid (i.e. a temperature above the freezing point of the system up to and including the boiling point of the system) it is preferred to employ a reaction temperature in the range of 20° C. to 120° C.

As illustrative of the phosphorothioates of this invention is the following:

S-(2-nitroethyl) O,O-dimethyl phosphorodithioate
O-(2-nitroethyl) O,O-dimethyl phosphorothioate
S-(1-methyl-2-nitroethyl) O,O-dimethyl phosphorodithioate
S-(2-nitropropyl) O,O-dimethyl phosphorodithioate
S-(2-nitro-t.butyl) O,O-dimethyl phosphorodithioate
S-(2-nitropropyl) O,O-diethyl phosphorothioate
O-(2-nitropropyl) O,O-diethyl phosphorothioate
S-(2-nitro-t.butyl) O,O-diethyl phosphorothioate
S-(2-nitrobutyl) O,O-diethyl phosphorothioate
S-(2-nitrobutyl) O,O-diethyl phosphorodithioate
S-(2-nitroisobutyl) O,O-dimethyl phosphorodithioate
O-(2-nitroisobuoyl O,O-diethyl phosphorothioate
S-(2-nitropropyl) O,O-diisopropyl phosphorothioate
S-(2-nitropropyl) O,O-dibutyl phosphorodithioate
S-(2-nitroethyl) O,O-diisoamyl phosphorodithioate
S-(2-nitro-2-methylbutyl) O,O-diethyl phosphorodithioate
S-(2-nitroisohexyl) O,O-diethyl phosphorodithioate As illustrative of the preparation of the phosphorothioates of this invention is the following:

Example I

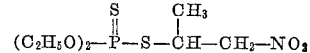

To a suitable reaction vessel equipped with a thermometer, agitator and reflux condenser is charged approximately 32 parts by weight of acetone, approximately 36.6 parts by weight (0.18 mole) of ammonium O,O-diethyl phosphorodithioate and approximately 21.0 parts by weight (0.17 mole) of 2-chloro-1-nitropropane. The mass is then heated at reflux for 4 hours. The acetone is then distilled off by heating to a pot temperature of 90° C. The residue is then cooled to room temperature, quenched with water and then extracted with benzene. The benzene solution is then washed first with 5% aqueous sodium carbonate and then with water. The so-washed organic solution is then subjected to vacuum distillation to remove the benzene. The residue, 44.0 parts by weight of an oil, is S-(1-methyl-2-nitroethyl) O,O-diethyl phosphorodithioate which is soluble in acetone and ethanol, but insoluble in water. Analysis: Theory, 11.4% P, 23.5% S, 5.1% N. Found, 11.3% P, 23.7% S, 4.8% N.

Example II

Employing the same procedure as in Example I but replacing ammonium O,O-diethyl phosphorodithioate with an equimolar amount of potassium O,O-dimethyl phosphorodithioate there is obtained S-(1-methyl-2-nitroethyl) O,O-dimethyl phosphorodithioate, an oil which is soluble in ethanol but insoluble in water.

Example III

Employing the same procedure as in Example I but replacing 2-chloro-1-nitropropane with an equimolar amount of 1-chloro-2-nitropropane there is obtained a 90.0% yield of S-(2-nitropropyl) O,O-diethyl phosphorodithioate an oil which is soluble in diethyl ether and chloroform but insoluble in water. Anaylsis: Theory, 23.5% S. Found 23.6% S.

Example IV

Employing the same procedure as in Example I but replacing ammonium O,O-diethyl phosphorodithioate with an equimolar amount of sodium O,O-di(2-methoxyethyl) phosphorodithioate there is obtained S-(1-methyl-2-nitroethyl) O,O-di(2-methoxyethyl) phosphorodithioate, an oil which is soluble in chloroform but insoluble in water.

Example V

Employing the procedure of Example I but replacing 2-chloro-1-nitropropane with an equimolar amount of 2-nitroethylchloride there is obtained S-(2-nitroethyl) O,O-diethyl phosphorodithioate, an oil which is soluble in acetone but insoluble in water.

Example VI

Employing the procedure of Example I but replacing but replacing ammonium O,O-diethyl phosphorodithioate with an equimolar amount of potassium O,O-diethyl phosphorothioate there is obtained S-(1-methyl-2-nitroethyl) O,O-diethyl phosphorothioate, an amber oil, which is soluble in ethanol but insoluble in water. Analysis: Theory 12.1% P, 12.5% S. Found 11.9% P, 12.2% S.

Example VII

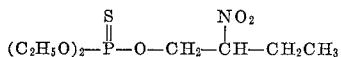

To a suitable reaction vessel equipped with a thermometer, agitator and reflux condenser is charged approximately 145 parts by weight of benzene, approximately 31.6 parts by weight (0.265 mole) of 2-nitrobutanol, approximately 50.0 parts by weight (0.265 mole) of O,O-diethyl phosphorochloridothioate, 22.9 parts by weight (0.29 mole) of pyridine, and approximately 0.5 part by weight of copper powder. The reaction mass is heated to reflux and refluxed for 7.25 hours. The mass is cooled to room temperature and washed with water, then aqueous sodium carbonate and then finally with water. The so-washed organic solution is then subjected to vacuum distillation to remove the benzene. The residue, 42.0 parts by weight of an oil, is O-(2-nitrobutyl) O,O-diethyl phosphorothioate which is soluble in acetone and ethyl acetate but insoluble in water. Analysis: Theory, 11.4% P, 11.8% S. Found 11.4% P, 12.0% S.

Example VIII

Employing the procedure of Example VII but replacing 2-nitrobutanol with an equimolar amount of 2-nitroethanol there is obtained O-(2-nitroethyl) O,O-diethyl phosphorothioate, an oil which is soluble in acetone but insoluble in water.

Example IX

Employing the procedure of Example VII but replacing 2-nitrobutanol with an equimolar amount of 2-nitro-t.butanol there is obtained O-(2-nitro-t.butyl) O,O-diethyl phosphorothioate, an oil which is soluble in acetone but insoluble in water.

Example X

Employing the procedure of Example I but replacing 1-chloro-2-nitropropane with an equimolar amount of 2-nitro-t.butylchloride there is obtained S-(2-nitro-t.butyl) O,O-diethyl phosphorodithioate, an oil which is soluble in chloroform but insoluble in water.

Example XI

Employing the procedure of Example I but replacing 1-chloro-2-nitropropane with an equimolar amount of 2-nitro-n-pentanyl bromide there is obtained S-(2-nitro-n-pentanyl) O,O-diethyl phosphorodithioate an oil which is soluble in chloroform but insoluble in water.

Example A

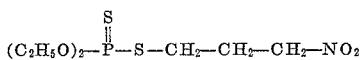

Employing the procedure of Example I but replacing 2-chloro-1-nitropropane with an equimolar amount of 1-chloro-3-nitropropane there is obtained S-(3-nitropropyl) O,O-diethyl phosphorodithioate, an oil which is soluble in chloroform, acetone and ethanol but insoluble in water.

With respect to the foregoing illustrative processes any inert organic liquid or mixture of inert organic liquids can be used provided at least one of the reactants is soluble therein. The methods by which the phosphorothioates of this invention are isolated will vary slightly with the reactants employed and the product produced. Further purification by selective solvent extraction or by absorptive agents such as activated carbon or clays can precede the removal of the inert organic liquid or solvent. Additionally an inert organic solvent can be used to and in the purification by absorptive agents. However, the product is generally satisfactory for nematocidal purposes without further purification.

Nematocidal activity of the phosphorothioates of this invention is demonstrated by preparing a suspension of the nematode *Panagrellus redivivus* in water and observing through a microscope the motility of the organisms in the presence of 0.1% of the test material. The nematode in aqueous suspension will flex its body at a regular rate and as the test material takes effect, the rate of flexing will decrease. In the following table, employing the itemized phosphorothioates, the loss of motility of the nematode is set forth.

| Phosphorothioate Added | Percent motility after 24 Hours |
|---|---|
| None | 100 |
| S-(1-methyl-2-nitroethyl) O,O-diethyl phosphorodithioate (product of Ex. I) | 0 |
| O-(2-nitrobutyl) O,O-diethyl phosphorothioate (product of Ex. VII) | 5 |
| S-(1-methyl-2-nitroethyl) O,O-diethyl phosphorothioate (product of Ex. VI) | 10 |
| S-(3-nitropropyl) O,O-diethyl phosphorodithioate (product of Ex. A) | 100 |

Although the phosphorothioates of this invention are useful per se in controlling nematodes, it is preferable that they be supplied to the soil environment of the nematodes in a dispersed form in a suitable extending agent.

In the instant specification and appended claims it is to be understood that the term "dispersed" is used in its widest possible sense. When it is said that the phosphorothioates of this invention are dispersed, it means that the particles of the phosphorothioates of this invention may be molecular in size and held in true solution in a suitable organic solvent. It means further, that the particles may be colloidal in size and distributed throughout a liquid phase in the form of suspensions or emulsions or in the form of particles held in suspension by wetting agents. The term "dispersed" also means that the particles may be mixed with and distributed throughout a solid carrier providing a mixture in particulate form, e.g., pellets, granules, powders, or dusts.

In the instant specification and appended claims it is to be understood that the expression "extending agent" includes any and all of those substances in which the phosphorothioates of this invention are dispersed. It includes, therefore, the solvents of a true solution, the liquid phase of suspensions or emulsions, and the solid phase of particulate solids, e.g. pellets, granules, dusts and powders.

The exact concentration of the phisphorothioates of this invention employed in combatting or controlling nematodes can vary considerably provided the required dosage (i.e. toxic or lethal amount) thereof is supplied to the nematodes or to the environment of the nematodes.

When the extending agent is a liquid or mixture of liquids (e.g. as in solutions, suspensions, emulsions et cetera), the concentration of the phosphorothioate employed to supply the desired dosage generally will be in the range of 0.1 to 50 percent by weight. When the extending agent is a solid, the concentration of the phosphorothioate employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g. powdered clay or talc) or other low-cost material available to the agriculturist at the point of use, he will have an easily prepared nematocidal composition. In such a concentrate composition, the phosphorothioate generally will be present in a concentration of 5 to 95 percent by weight, the residue being any one or more of the well-known nematocidal adjuvants, such as the various surface-active agents (e.g., detergents, a soap or other emulsifying or wetting agent, surface-active clays), solvents, diluents, carrier media, humectants, and the like.

There are a large number of organic liquids which can be used for the preparation of solutions, suspensions or emulsions of the phosphorothioates of this invention. For example isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F. at atmospheric pressure and having a flash point above about 80° F., particularly kerosene) mineral oils having an unsulfonatable residue above about 80 percent and preferably above about 90 percent. In those instances wherein there may be concern about the phytotoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent.

The phosphorothioates of this invention are preferably supplied to the enviroment of the nematode pests in the form of emulsions or suspensions. Emulsions or suspensions are prepared by dispersing the phosphorothioates of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958 Interscience Publishers, Inc., New York), in place of the expression "emulsifying agents," to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also, Frear "Chemistry of Insecticides, Fungicides and Herbicides," second edition, page 280). These surfactants include the well-known capillary-active substances which may be anion-active (or anionic), cation-active (or cationic), or non-ionizing (or non-ionic) which are described in detail in volumes I and II of Schwartz, Perry and Berch's "Surface Active Agents and Detergents" (1958 Interscience Publishers, Inc., New York), and also in the November 1947 issue of Chemical Industries (pages 811–824) in an article entitled "Synthetic Detergents" by John W. McCutcheon and also in the July, August, September and October 1952 issues of Soap and Sanitary Chemicals under the title "Synthetic Detergents." The disclosures of these articles with respect to surfactants, i.e. the anion-active, cation-active and non-ionizing capillary active substances, are incorporated in this specification by reference in order to avoid unnecessary enlargement of this specification. The preferred surfactants are the water-soluble anionic surface-active agents and the water soluble non-ionic surface-active agents set forth in U.S. 2,846,398 (issued August 5, 1958). In general it is preferred that a mixture of water-soluble anionic and water-soluble non-ionic surfactants be employed.

The phosphorothioates of this invention can be dispersed by suitable methods (e.g. tumbling or grinding), in solid extending agents either of organic or inorganic nature and supplied to the nematode pest environment in particulate form. Such solid materials include, for example, tricalcium phosphate, calcium carbonate, kaolin, bole, kieselguhr, talc, bentonite, fuller's earth, pyrophilite, diatomaceous earth, calcined magnesia, volcanic ash, sulfur and the like inorganic solid materials, and include, for example, such materials of organic nature as powdered cork, powdered wood, and powdered walnut shells. The preferred solid carriers are the adsorbent clays, e.g. bentonite. These mixtures can be used for nematocidal purposes in the dry form or, by addition of water-soluble surfactants or wetting agents the dry particulate solids can be rendered wettable by water so as to obtain stable aqueous dispersions or suspensions suitable for use as sprays.

In all of the forms described above the dispersions can be provided ready for use in combatting nematode pests or they can be provided in a concentrated form suitable for mixing with or dispersing in other extending agents. As illustrative of a particularly useful concentrate is an intimate mixture of phosphorothioates of this invention with a water-soluble surfactant which lowers the surface tension of water in the weight proportions of 0.1 to 15 parts of surfactant with sufficient of the phosphorothioate of this invention to make 100 parts by weight. Such a concentrate is particularly adapted to be made into a spray for combatting various forms of nematode pests by the addition of water thereto. As illustrative of such a concentrate is an intimate mixture of 95 parts by weight of S-(1-methyl-2-nitro-ethyl) O,O-diethyl phosphorodithioate and 5 parts by weight of a water-soluble non-ionic surfactant such as the polyoxyethylene derivative of sorbitan monolaurate.

Another useful concentrate adapted to be made into a spray for combatting nematode pests is a solution (preferably as concentrated as possible) of a phosphorothioate of this invention in an organic solvent therefor. The said liquid concentrate preferably contains dissolved therein in a minor amount (e.g. 0.5 to 10 percent by weight of the weight of the new nematocidal agent) of a surfactant (or emulsifying agent), which surfactant is also water-soluble. As illustrative of such a concentrate is a solution of S-(2-nitrobutyl) O,O-diethyl phosphorothioate in acetone which solution contains dissolved therein a water-soluble polyoxyethylene glycol non-ionic surfactant and a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well-known water-soluble alkylaryl sulfonates such as sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water-soluble polyoxyethylene derivatives of the mono higher fatty acid esters of sorbitan.

In all of the various dispersions described hereinbefore for nematocidal purposes, the active ingredient can be one or more of the compounds of this invention. The compounds of this invention can also be advantageously employed in combination with other pesticides, including for example insecticides, fungicides, bactericides, and herbicides. In this manner it is possible to obtain mixtures which are effective against a wide variety of pests and other forms of noxious life.

In controlling or combatting nematode pests the phosphorothioates of this invention either per se or compositions comprising same are supplied to their environment in a lethal or toxic amount. This can be done by distributing or incorporating the nematocidal agent or nematocidal composition comprising same in the environment of the nematode, e.g. agricultural soil or other growth media or other media infested with the nematode pests in any conventional fashion which permits sub-surface contact between the nematode pests and the phosphorothioates of this invention. Such dispersing can be brought about by distributing or incorporating sprays or particulate solid compositions in a soil infested with the nematodes by any of the conventional methods, e.g. by disking or plowing into or under the surface of the field, or strewn into the furrow behind a plowshare and thereafter covering by succeeding furrow slice. Also for sub-surface application such dispersing can be carried out by spot injecting or drilling the new insecticidal agent per se or insecticidal spray or particulate solid compositions comprising same into the infested environment.

As illustrative of other mono-halogen substituted alkane reactants having a nitro substituent on the carbon atom adjacent that having the halogen substituent are 2-bromo-1-nitropropane, 1-bromo-2-nitropropane (or 2-nitropropyl bromide), 2-nitrobutyl chloride, 2-chloro-3-nitrobutane, 2-nitroisoamyl bromide, 2-nitro-3-chloroisopentane and 2-nitroisohexyl chloride.

As illustrative of other mono-hydroxy alkane reactants having a nitro substituent on the carbon atom adjacent that having the hydroxy substituent are 2-nitropropanol, 2-nitro isoamyl alcohol, 2-nitro sec. amyl alcohol and 2-nitro isohexyl alcohol.

The phosphorothioates of this invention can also be obtained by reacting a phosphorothioic acid of the structure

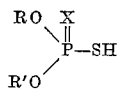

wherein X, R and R' have the aforedescribed significance with a substantially equimolar amount of a mono-nitro substituted mono-olefin containing from 2 to 6, but preferably 3 to 5, carbon atoms wherein the nitro substituent is attached to an olefinic carbon

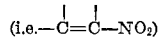

e.g. nitroethylene, 1-nitropropyl-1-ene, 2-nitropropyl-1-ene, 1-nitrobutyl-1-ene, 2-nitrobutyl-2-ene, 2-nitro-3-methylbutyl-2-ene, 2-nitro-3-methyl-n-amyl-2-ene, etc.), in the presence of an inert organic liquid or solvent (e.g. benzene, toluene, xylene, acetone, butanone, dioxane, etc.). While a wide range of reaction temperatures can be employed provided the system is fluid (i.e. a temperature above the freezing point of the system up to and including the boiling point of the system) it is preferred to employ a reaction temperature in the range of 20° C. to 120° C. This reaction can be accelerated by the use of aliphatic tertiary organic amines (e.g. triethylamine, triisopropylamine, tributylamine, and the like). Any catalytic amount can be used which amount generally will be in the range of 0.2 to 2.0% by weight of the total weight of the reactants. When desired a small amount of a polymerization inhibitor, e.g. hydroquinone, can be employed. As illustrative of this process is the following:

*Example XII*

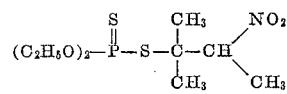

To a suitable reaction vessel equipped with a thermometer, agitator and reflux condenser is charged 63.4 parts by weight (0.33 mole) of O,O-diethyl dithiophosphoric acid and 100 parts by weight of benzene. While agitating and maintaining the mass at 40–50° C. is added over a 30 minute period, 38 parts by weight (0.33 mole) of 2-nitro-3-methyl-butyl-2-ene. The reaction mass is then heated with agitation for 1 hour at 50° C. The reaction mass is then cooled to room temperature and is washed first with dilute aqueous sodium carbonate and then with water. The so-washed organic solution is then subjected to vacuum distillation to remove the benzene and other volatiles. The residue, an oil, is S-(1,1-dimethyl-2-nitropropyl) O,O-diethyl phosphorodithioate which is soluble in acetone but insoluble in water.

While this invention has been described with respect to certain embodiments, it is to be understood that it is not so limited and that variations and modifications thereof obvious to those skilled in the art can be made without departing from the spirit and scope thereof.

What is claimed is:

1. The method of destroying parasitic worm life in nematode infested agricultural soils which comprises contacting the said worm life in the soil with an amount toxic to same of at least one 2-nitroalkyl phosphorothioate of the structure

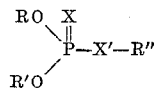

wherein R and R' are selected from the group consisting of lower alkyl radicals and lower alkoxyalkyl radicals, wherein X and X' are chalkogens of atomic weight less than 40 but wherein at least one of X and X' is sulfur, and wherein R" is a 2-nitroalkyl radical containing from 2 to 6 carbon atoms.

2. The method of destroying parasitic worm life in nematode infested agricultural soils which comprises contacting the said worm life in the soil with an amount toxic to same of at least one compound of the structure

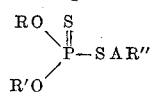

wherein R and R' are alkyl radicals containing not more than two carbon atoms and wherein R" is a 2-nitroalkyl radical containing from 3 to 5 carbon atoms.

3. The method of destroying parasitic worm life in nematode infested agricultural soils which comprises contacting the said worm life in the soil with an amount toxic to same of S-(1-methyl-2-nitroethyl) O,O-diethylphosphorodithioate.

References Cited in the file of this patent

UNITED STATES PATENTS

| | | |
|---|---|---|
| 2,578,652 | Cassaday | Dec. 18, 1951 |
| 2,802,856 | Norman | Aug. 13, 1957 |
| 2,979,522 | Johnston et al. | Apr. 11, 1961 |

FOREIGN PATENTS

| | | |
|---|---|---|
| 1,023,760 | Germany | Feb. 6, 1958 |

OTHER REFERENCES

Schrader: "Angew. Chem.," vol. 69, pages 86–90 (1957).